United States Patent
Aciicmez et al.

(10) Patent No.: US 8,218,772 B2
(45) Date of Patent: Jul. 10, 2012

(54) SECURE MULTICAST CONTENT DELIVERY

(75) Inventors: Onur Aciicmez, San Jose, CA (US); Xinwen Zhang, San Jose, CA (US); Jean-Pierre Seifert, Tirol (AT)

(73) Assignee: Samsung Electronics Co., Ltd., Suwon (KR)

( * ) Notice: Subject to any disclaimer, the term of this patent is extended or adjusted under 35 U.S.C. 154(b) by 1045 days.

(21) Appl. No.: 12/165,201

(22) Filed: Jun. 30, 2008

(65) Prior Publication Data

US 2009/0323962 A1    Dec. 31, 2009

(51) Int. Cl.
*H04L 9/00* (2006.01)

(52) U.S. Cl. ........................................ 380/277

(58) Field of Classification Search .............. 713/1, 100, 713/189, 193, 165–167; 380/277, 281, 282, 380/286
See application file for complete search history.

(56) References Cited

U.S. PATENT DOCUMENTS

| | | | |
|---|---|---|---|
| 7,080,039 B1 * | 7/2006 | Marsh | 705/51 |
| 7,434,046 B1 * | 10/2008 | Srivastava | 713/163 |
| 7,921,223 B2 * | 4/2011 | Evans et al. | 709/231 |
| 2006/0265603 A1 * | 11/2006 | McLean et al. | 713/189 |
| 2007/0172067 A1 * | 7/2007 | Otal et al. | 380/277 |
| 2008/0065878 A1 * | 3/2008 | Hutson et al. | 713/153 |
| 2009/0041249 A1 * | 2/2009 | Tanaka et al. | 380/277 |
| 2011/0131411 A1 * | 6/2011 | Lin et al. | 713/168 |

OTHER PUBLICATIONS

Y. Gasmi et al., "Beyond Secure Channels", Proceedings of the 2007 ACM Workshop on Scalable Trusted Computing (STC'07), pp. 30-40, ACM Press 2007.

* cited by examiner

*Primary Examiner* — Beemnet Dada
(74) *Attorney, Agent, or Firm* — Beyer Law Group LLP

(57) ABSTRACT

In one embodiment, a method for establishing a secure multicast channel between a service provider and a terminal is provided. A request is received from the service provider for a configuration of the terminal. A configuration of the terminal at a first time is sent to the service provider. A security key is obtained, wherein the security is bound to the configuration of the terminal at the first time. Then the security key is decrypted using a configuration of the terminal at a second time, wherein the decryption fails if the configuration of the terminal at the second time is not identical to the configuration of the terminal at the first time. A secure multicast channel is then established with the service provider using the security key.

20 Claims, 6 Drawing Sheets

SECURE MULTICAST CONTENT DELIVERY

BACKGROUND OF THE INVENTION

1. Field of the Invention

The present invention relates to computing. More particularly, the present invention relates to the creation of the secure delivery of multicast content over a network.

2. Description of the Related Art

Internet Protocol (IP) broadcasting involves the transmission of content to multiple clients on a network via the IP protocol. IP broadcasting is part of the broader field of multicasting, which involves any transmission of content to multiple destinations simultaneously. As such, multicasting includes not only IP broadcasting but also more traditional broadcasts such as cable or satellite television broadcasts, and includes content that can be delivered via channels, or schedules of programming usually delineated by genre or distributor.

In IP broadcasting, channel content is delivered over an IP network via multicasting. The user selects the channel he wants to view and a terminal IP broadcasting device, such as a set-top box, starts receiving and displaying the content in real time.

Multicasting can be distinguished from other types of content delivery services such as Video-on-demand (VOD) streaming and content downloading. In VOD streaming, the user chooses a particular piece of content from a list of available contents and the service provider starts streaming the content whenever the user wishes. Thus, upon the request of the user, a terminal device (e.g., set-top box) asks the service provider to start streaming the content, receives it, and displays it.

In the content download model, a user is able to download content to a storage medium (e.g., a hard drive of a set-top box) and view it anytime afterwards.

Thus, while IP broadcasting is a multicast model, VOD and content download are unicast models.

Key concepts in IP Multicast include an IP multicast group address, a multicast distribution tree, and receiver driven tree creation. An IP Multicast group address is used by sources and receivers to send and receive content. Sources use the group address as the IP destination address in outgoing data packets, while receivers use the group address to inform the network that they are interested in receiving packets sent to the group. The protocol used by receivers to join a group is the Internet Group Management Protocol (IGMP).

Once receivers join a particular IP Multicast group, a multicast distribution tree is constructed for that group. The protocol most widely used for this is Protocol Independent Multicast (PIM). It sets up multicast distribution trees such that data packets from sends to a multicast group reach all receivers that have joined the group.

IP Multicast does not require a source sending a given group to know about any of the receivers in the group. The multicast tree construction can be initiated by network nodes that are close to, or at the receivers. This allows it to scale to a large receiver population.

SUMMARY OF THE INVENTION

In one embodiment, a method for establishing a secure multicast channel between a service provider and a terminal is provided. A request is received from the service provider for a configuration of the terminal. A configuration of the terminal at a first time is sent to the service provider. A security key is obtained, wherein the security is bound to the configuration of the terminal at the first time. Then the security key is decrypted using a configuration of the terminal at a second time, wherein the decryption fails if the configuration of the terminal at the second time is not identical to the configuration of the terminal at the first time. A secure multicast channel is then established with the service provider using the security key.

In another embodiment, another method for establishing a secure multicast channel between a service provider and a terminal is provided. A security module is instructed to create a public key and a private key. The security module is also instructed to bind the private key to a configuration of the terminal at a first time. The security module is further instructed to create a certificate for the public key, wherein the certificate denotes the configuration of the terminal at a first time. The public key and certificate are sent to the service provider. A secret key encrypted with the public key is received from the service provider. Then the security module is instructed to decrypt the private key using a configuration of the terminal at a second time. If the decryption of the private key is successful, the decrypted private key is used to decrypt the encrypted secret key. Then the secret key is used to establish a secure multicast channel between the service provider and the terminal.

In another embodiment, a system is provided comprising: a network interface; a processor; a memory, wherein the memory is configured to store a current configuration of a terminal, wherein the processor is configured to: receive a request from the service provider for a configuration of the terminal; send a configuration of the terminal at a first time to the service provider; obtain a security key, wherein the security is bound to the configuration of the terminal at the first time; decrypt the security key using a configuration of the terminal at a second time, wherein the decryption fails if the configuration of the terminal at the second time is not identical to the configuration of the terminal at the first time; and establish a secure multicast channel with the service provider using the security key.

In another embodiment, another system is provided comprising: a network interface; a processor; a security module; a memory, wherein the memory is configured to store a current configuration of a terminal, wherein the processor is configured to: instruct a security module to create a public key and a private key; instruct the security module to bind the private key to a configuration of the terminal at a first time; instruct the security module to create a certificate for the public key, wherein the certificate denotes the configuration of the terminal at a first time; send the public key and certificate to the service provider; receive, from the service provider, a secret key encrypted with the public key; instruct the security module to decrypt the private key using a configuration of the terminal at a second time; if the decryption of the private key is successful, use the decrypted private key to decrypt the encrypted secret key; and use the secret key to establish a secure multicast channel between the service provider and the terminal.

In another embodiment, an apparatus for establishing a secure multicast channel between a service provider and a terminal is provided, the apparatus comprising: means for receiving a request from the service provider for a configuration of the terminal; means for sending a configuration of the terminal at a first time to the service provider; means for obtaining a security key, wherein the security is bound to the configuration of the terminal at the first time; means for decrypting the security key using a configuration of the terminal at a second time, wherein the decryption fails if the configuration of the terminal at the second time is not identical to the configuration of the terminal at the first time; and means for establishing a secure multicast channel with the service provider using the security key.

In another embodiment, another apparatus for establishing a secure multicast channel between a service provider and a terminal is provided, the apparatus comprising: means for instructing a security module to create a public key and a private key; means for instructing the security module to bind the private key to a configuration of the terminal at a first time; means for instructing the security module to create a certificate for the public key, wherein the certificate denotes the configuration of the terminal at a first time; means for sending the public key and certificate to the service provider; means for receiving, from the service provider, a secret key encrypted with the public key; means for instructing the security module to decrypt the private key using a configuration of the terminal at a second time; means for, if the decryption of the private key is successful, using the decrypted private key to decrypt the encrypted secret key; and means for using the secret key to establish a secure multicast channel between the service provider and the terminal.

In another embodiment, a program storage device readable by a machine tangibly embodying a program of instructions executable by the machine to perform a method for establishing a secure multicast channel between a service provider and a terminal is provided, the method comprising: receiving a request from the service provider for a configuration of the terminal; sending a configuration of the terminal at a first time to the service provider; obtaining a security key, wherein the security is bound to the configuration of the terminal at the first time; decrypting the security key using a configuration of the terminal at a second time, wherein the decryption fails if the configuration of the terminal at the second time is not identical to the configuration of the terminal at the first time; and establishing a secure multicast channel with the service provider using the security key.

In another embodiment, another program storage device readable by a machine tangibly embodying a program of instructions executable by the machine to perform a method for establishing a secure multicast channel between a service provider and a terminal is provided, the method comprising: instructing a security module to create a public key and a private key; instructing the security module to bind the private key to a configuration of the terminal at a first time; instructing the security module to create a certificate for the public key, wherein the certificate denotes the configuration of the terminal at a first time; sending the public key and certificate to the service provider; receiving, from the service provider, a secret key encrypted with the public key; instructing the security module to decrypt the private key using a configuration of the terminal at a second time; if the decryption of the private key is successful, using the decrypted private key to decrypt the encrypted secret key; and using the secret key to establish a secure multicast channel between the service provider and the terminal.

DETAILED DESCRIPTION OF SPECIFIC EMBODIMENTS

Figure 1:
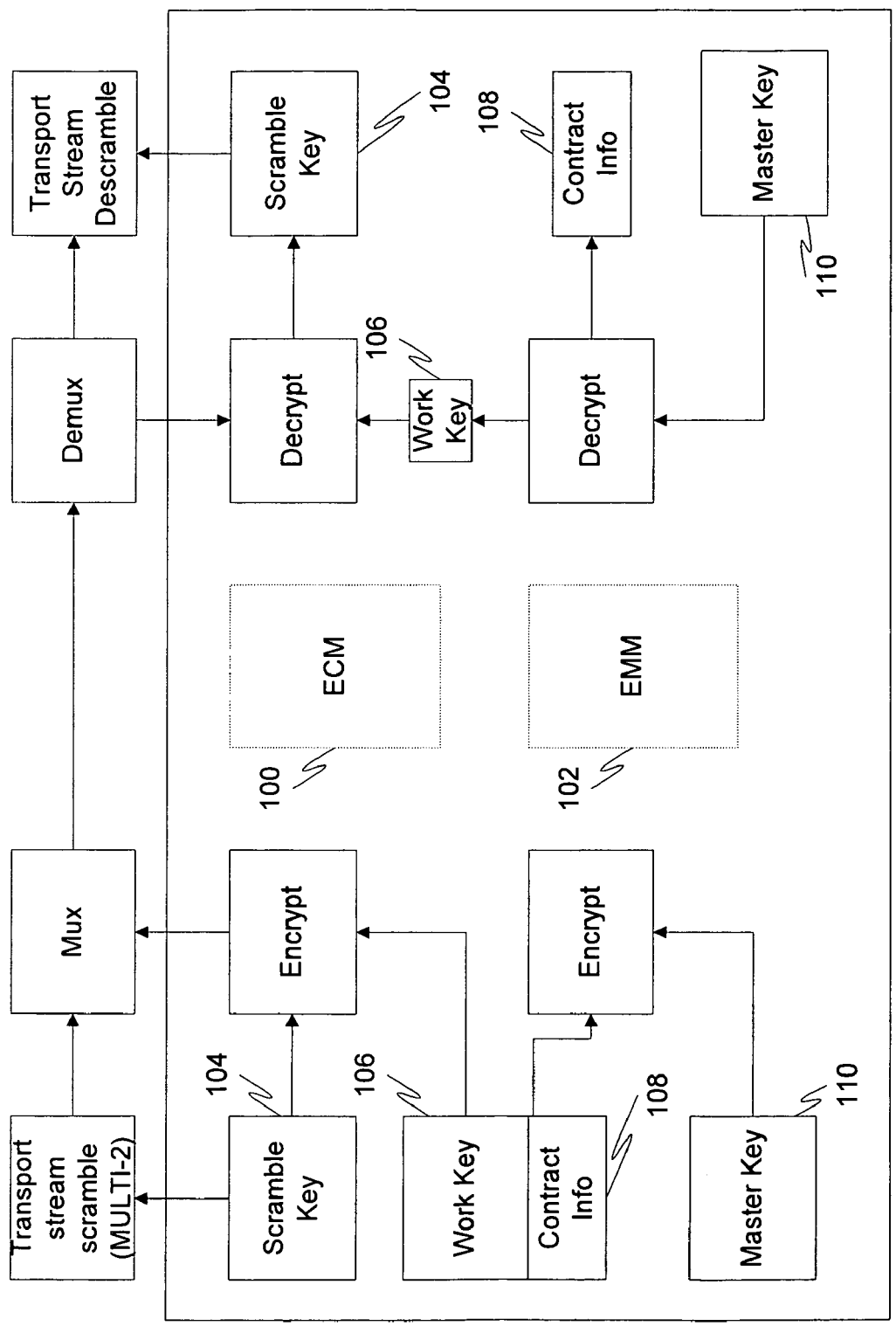
FIG. 1 is a diagram illustrating a system that electronically scrambles a signal.

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

In accordance with the present invention, the components, process steps, and/or data structures may be implemented using various types of operating systems, programming languages, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

Throughout this application, examples are provided involving various standards, such as CAS/DRM as well as other technologies such as smartcards. These examples are intended to be illustrative and should not be used to limit the scope of the claims unless expressly stated in the claims.

The term "terminal" shall include any end-point device, such as set-top boxes, computers, digital televisions, for example, or any other device that can perform the functions described in this document.

Set-top boxes or other terminal devices in multicast systems may utilize smartcards to ensure proper security. Smartcards are removable devices that contain embedded identification information. A smart card is inserted into a hardware device, and then the hardware device may transmit the identification information on the card to a network, where some type of authentication is performed to permit the hardware device to access certain data or services while the smart card is inserted.

Smartcard based Conditional Access Systems (CASes). A CAS is a system that can be used for secure distribution of broadcasting content by limiting the content only to subscribed and authorized users through the use of cryptography and security mechanisms. There are various different types and implementations of CAS systems, and nothing in this document shall be interpreting as limiting the invention to any particular CAS system, or to CAS systems as a whole. Sometimes even the details of a CAS are kept secret to achieve greater security.

In one example CAS system, a three-layer key structure is utilized, including a master key, work key, and scramble key. A symmetric key encryption scheme may be adopted for each encryption process. That is, the encryption key used at the transmission end and the decryption key used at the receiver side are the same.

The master key is a secret key that is kept in each terminal. Each master key is unique. The scramble key is used to encrypt or scramble (and subsequently to decrypt or descramble) the broadcast content itself. In order to maintain security, the scramble key is updated via frequent broadcasts but is encrypted with the work key. The work key is common to all terminals, but is encrypted with the master key. Thus, the scramble key cannot be decrypted without the work key, which cannot be decrypted without the master key. It should be noted that some sources use the term "control word" instead of scramble key. However, for purposes of this document, the term scramble key shall be construed broadly to mean a key used to encrypt the content itself.

The broadcast content itself, including video and audio, is scrambled at, for example, the layer of an MPEG-2 transport stream (TS) packet. The MULTI-2 block cipher algorithm, for example, may be used as the scramble scheme.

It should be noted that while this document may describe the inventions in terms of a CAS embodiment, nothing in this document shall be construed as limiting the invention to such an embodiment. Likewise, embodiments are also possible where non-symmetric keys are utilized.

FIG. 1 is a diagram illustrating a system that electronically scrambles a signal. In order to control and manage the CAS functions of the terminals, two kinds of CAS information may be broadcast. These are known as the entitlement control message (ECM) 100 and the entitlement management message (EMM) 102.

The ECM 100 includes the scramble key 104 and other information relating to scrambling control, whose confidential part is encrypted with the work key. As the scramble key 104 is updated frequently (e.g., once a second), the ECM is transmitted frequently.

The EMM 102 includes information units for individual terminals. Each information unit includes a work key 106, contract information 108, and other information related to management whose confidential part is encrypted with the master key 110.

Thus, through the use of a CAS system with smartcards, broadcast content channels can be securely established.

Smartcards, however, are removable. This removability prevents a networked system from ever being totally sure of the identity of the device. While the smartcard may be authentic, the hardware device to which it is attached may not be, or may have been modified (either intentionally or unintentionally) in a way that creates a security risk to the system.

In an embodiment of the present invention, a trusted platform module (TPM) or similar module is leveraged to provide a better solution for multicast content delivery. A TPM is a secure cryptoprocessor that can store security information. The TPM is integrated into the hardware device, enabling it to uniquely identify and authenticate the hardware device. By leveraging this technology for multicast content delivery, a system is better able to verify that a user device is authentic, aiding in providing a more secure system.

More specifically, in one embodiment, a trusted channel may be established in order to deliver the master key(s). The master key may be encrypted in a manner such that it is bound to the configuration of the terminal. By binding the configuration of the terminal to a key, the transmission of the key is accomplished via a trusted mechanism because only a device matching the exact same configuration could decrypt the key.

Figure 2:
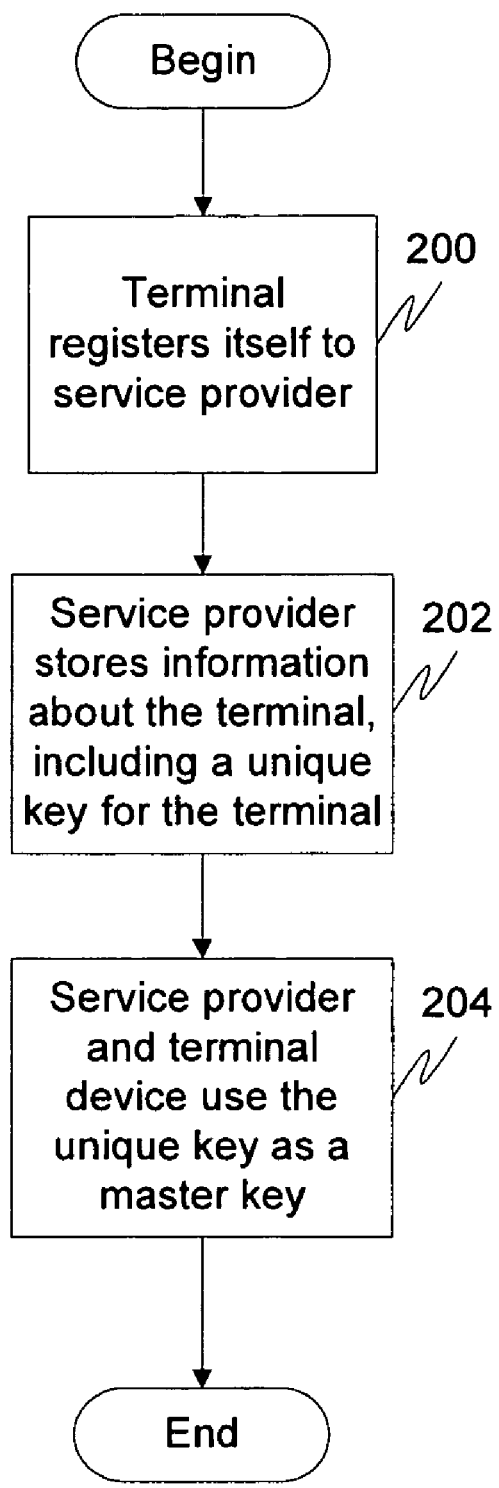
FIG. 2 is a flow diagram illustrating a method for providing trusted computing for multicasting content in accordance with an embodiment of the present invention

FIG. 2 is a flow diagram illustrating a method for multicasting content in accordance with an embodiment of the present invention. Each step in this method may be performed in hardware, software, or any combination thereof. At 200, the terminal (the hardware device requiring authentication) registers itself to a service provider. At 202, the service provider stores information about the terminal, including a unique key for the terminal. This unique key can be, for example, a key intrinsic to the hardware security chip (e.g., TPM chip), a key assigned by the service provider to the terminal, or even a key generated by the hardware security chip itself. The hardware security chip enables the service provider and the terminal to establish a secure communication channel.

At 204, the service provider and terminal device use the unique key as a master key, encrypting EMM messages with this key before sending them to the receiver.

In an embodiment of the present invention, the configuration of a terminal or application within the terminal may be verified before establishing a secure multicast channel. The configuration may include many different things, including, for example, the current state of operation of any running applications. However, in one embodiment of the present invention, the configuration is the entire execution chain (the chain of programs executed). For example, if the user simply turned on the device and executed Application A, the configuration might be Bootloader->Operating System->Application A. Likewise, if the user turned on applications A and B, then the configuration might be Bootloader->Operating System->Application A->Application B.

The configuration may also include additional details regarding the state of any relevant applications. For example, the configuration may include a version number of an application, which can be used to verify whether the application is up-to-date. The configuration may also include the results of an application integrity check, which may be performed to determine whether the application has been modified. This may be used to, for example, tell if an otherwise up-to-date application has been compromised via the introduction or removal of code.

Figure 3:
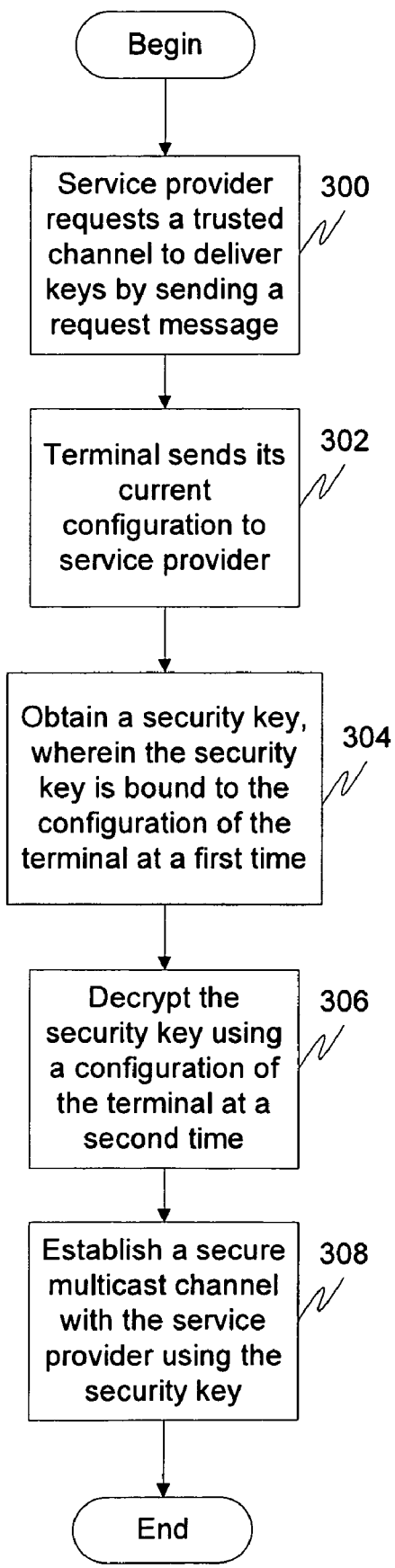
FIG. 3 is a flow diagram illustrating a method for secure multicast delivery in accordance with an embodiment of the present invention.

FIG. 3 is a flow diagram illustrating a method for secure multicast delivery in accordance with an embodiment of the present invention. Each step in this method may be performed in hardware, software, or any combination thereof. At 300, a service provider requests a trusted channel from a terminal by sending a request message. This request may include a request for the current configuration of the terminal. Alternatively, the request for the current configuration of the terminal may be sent in a separate step.

At 302, the terminal may send its current configuration to the service provider. Due to the fact that this configuration will be implicitly compared to a more current configuration of the terminal at a later time, the current configuration will be referred to as the configuration of the terminal at a first time (with the later time being a second time). At 304, a security key may be obtained, wherein the security key is bound to the configuration of the terminal at a first time. The obtaining of the security key may be accomplished in a variety of different ways, some of which will be described here, some later, and some not described at all in this document.

In a CAS system, at least one of the security keys bound to the configuration should be a master key. It should be noted that the term "bound to the configuration" does not necessarily imply a step of altering the key (e.g., encrypting it) using the configuration. It may also include a key being implicitly bound to the configuration by altering a prerequisite key using the configuration. It should be noted that the term "altering" should be interpreted broadly as including other possible alterations than merely encryption. However, it is believed that the current best mode of performing an alteration in line with the goals of the present invention would be to use some type of encryption.

For example, in a CAS-based example, the master key should be bound to the configuration. However, one possible CAS based approach would be to utilize a public-key scheme and bind the private key to the configuration. This private key is then necessary to be able to decrypt the master key, and hence is a "prerequisite" key. Therefore, even though the master key has not been altered itself using the configuration, it is still bound to the configuration because the private key, which is bound to the configuration, is necessary in order to decrypt the master key. The same would be true for any key dependent on a key that has been altered using the configuration. For example, since the master key is bound to the configuration, the work keys would also be bound to the configuration since the master key is necessary to decrypt the work keys. The use of public and private keys is described in more detail below with respect to FIG. 4.

Of course, embodiments are also possible wherein multiple keys are actively bound to the configuration (i.e., they are directly altered using the configuration). For example, both the private key and the master key may be modified based on the configuration.

It should be noted that the above is merely an example of a mechanism to establish a trusted channel. There are many different possible ways to establish a trusted channel. Other example methods are described in Y. Gasmi, A.-R. Sadeghi, P. Stewin, M. Unger, and N. Asokan. "Beyond secure channels," *Proceedings of the* 2007 *ACM workshop on Scalable trusted computing\\(STC '07),* pages 30-40, ACM Press, 2007.

At 306, the security key is decrypted using a configuration of the terminal at a second time (i.e., the configuration of the terminal at or near the time the decryption step is occurring). Because the security key is bound to the configuration, this decryption would fail if the configuration of the terminal at the second time is not identical to the configuration of the terminal at the first time. This allows the additional security feature of only permitting a secure channel to be set up with a particular device if the particular device's configuration has not changed.

Thus, not only can the system ensure that the device is the authorized device, but it can also ensure the authorized device has not been modified (either intentionally or unintentionally). Modification of configurations can create security breaches. Beyond that, however, service providers can also utilize this type of configuration-guaranteeing in order to prevent other unauthorized configuration changes. For example, while it is clear that a service provider would almost always want to protect against the malicious installation of spyware on a user's device, or the introduction of a computer worm, it is not always clear that a service provider would want to protect against the user's hacking of a set top box to enable commercials to be skipped when viewing downloaded television programs. While the former clearly is an issue that needs to be addressed prior to the establishment of a secure channel, the latter may or may not be. While some service providers may not mind or may not wish to address these types of alterations to applications, other service providers may wish to institute procedures to ensure that no modified application can establish a trusted channel.

At 308, a secure multicast channel can be established with the service provider using the security key. Depending upon implementation, there are a large number of different ways this may occur and the meaning of "using the security key" shall be interpreted broadly to cover many different embodiments. For example, this establishment may entail using the security key to obtain additional key(s) utilized to decrypt the actual content (and/or intermediate keys as well). In one example where the security key is a master key, the decrypted master key is used to decrypt work key(s), which are used to decrypt scramble key(s), which are then used to decrypt multicast content, hence establishing a secure distribution channel for the multicast content. Other embodiments are foreseen wherein more or fewer keys are utilized.

Figure 4:
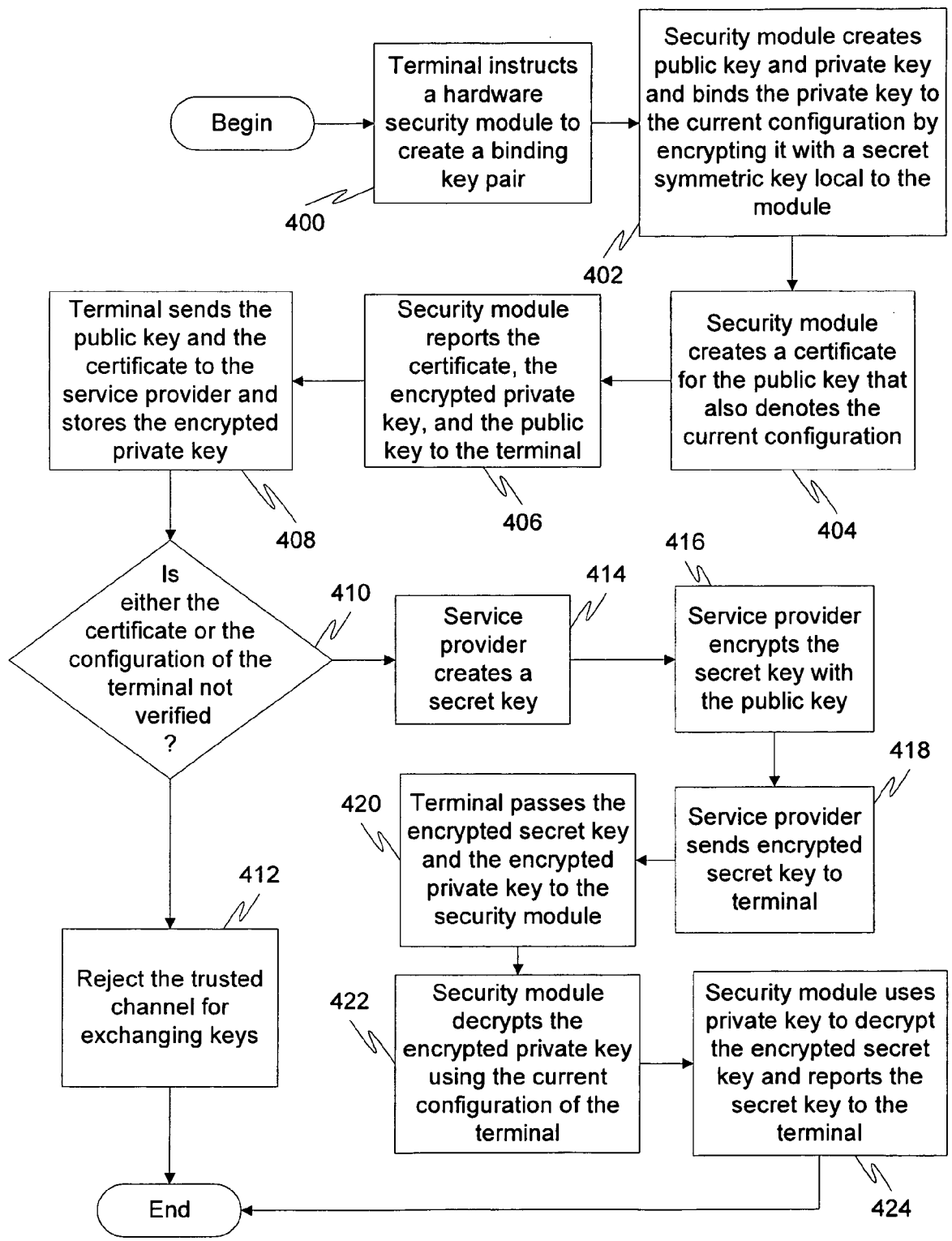
FIG. 4 is a flow diagram illustrating a method for establishing a secure multicast channel between a service provider and a terminal in accordance with another embodiment of the present invention.

FIG. 4 is a flow diagram illustrating a method for establishing a secure multicast channel in accordance with another embodiment of the present invention. At 400, a terminal may instruct a hardware security module (such as a TPM chip as previously discussed) to create a binding key pair. A binding key pair may comprise a public key and a private counterpart of the public key (referred to here as a private key). The use of the private key can be restricted to the current configuration of the terminal.

At 402, the security module creates the public key and private key and binds the private key to the current configuration by encrypting it with a secret symmetric key local to the module (for example, a storage root key of a TPM). This creates an encrypted private key.

At 404, the security module creates a certificate for the public key that also denotes the current configuration. This can be performed by, for example, using an Attestation Identify Key in a TPM just like a remote attestation.

At 406, the security module reports the certificate, the encrypted private key, and the public key to the terminal.

At 408, the terminal sends the public key and the certificate to the service provider and stores the encrypted private key.

At 410, the service provider verifies the certificate and also the configuration of the terminal. If either the certificate or the configuration of the terminal is not verified, then at 412 a trusted channel for exchanging keys is rejected. If the configuration and certificate are acceptable, then at 414 a secret key (such as a master key) is created.

At 416, the service provider encrypts the secret key with the public key. As described above, this secret key is also bound to the configuration just like the encrypted private key, because the encrypted private key is required to be decrypted prior to being able to access the secret key. However, embodiments are also foreseen wherein an addition step of encrypting the secret key using the configuration is also performed.

At 418, the encrypted secret key is sent to the terminal.

At 420, the terminal passes the encrypted secret key and the encrypted private key to the security module. At 422, the security module decrypts the encrypted private key using the current configuration of the terminal. If the configuration is the same as the one that was used during binding of the private key, the decryption will result in the private key, otherwise the result will be gibberish.

At 424, the security module uses the private key to decrypt the encrypted secret key and reports the secret key to the terminal.

Therefore, if the terminal is legitimate and is in the right configuration, it can obtain the secret key. The key is secret and shared between the service provider and the terminal, and therefore can be used to establish secure communications in an efficient manner.

The actions taken if the configurations do not match (and thus the decryption of the encrypted secret key fails) may vary. Rejection of the immediate request to establish a trusted channel for the exchange of keys is likely a good idea, at least until such time as a different configuration could be deemed acceptable or a proper configuration loaded. Other types of actions could also be taken. For example, one possible choice would be to force the device to reload the original configuration. This may be performed by having an update mechanism in the terminal or security module that forces an update to the terminal in the case of a failed configuration check.

The configurations described earlier as being verified can be the configurations of the entire software suite operating on the device, or may be just the configurations of individual applications. In other words, the configurations of individual applications may be verified instead of needing to verify the configuration of all the applications. It is therefore possible, for example, for a trusted multicast channel to be established between a first application operating on a device and the service provider even though a second application operating on the device may be unable to establish the trusted multicast channel. This could happen if, for example, the second application has been hacked or altered while the first has not.

Figure 5:
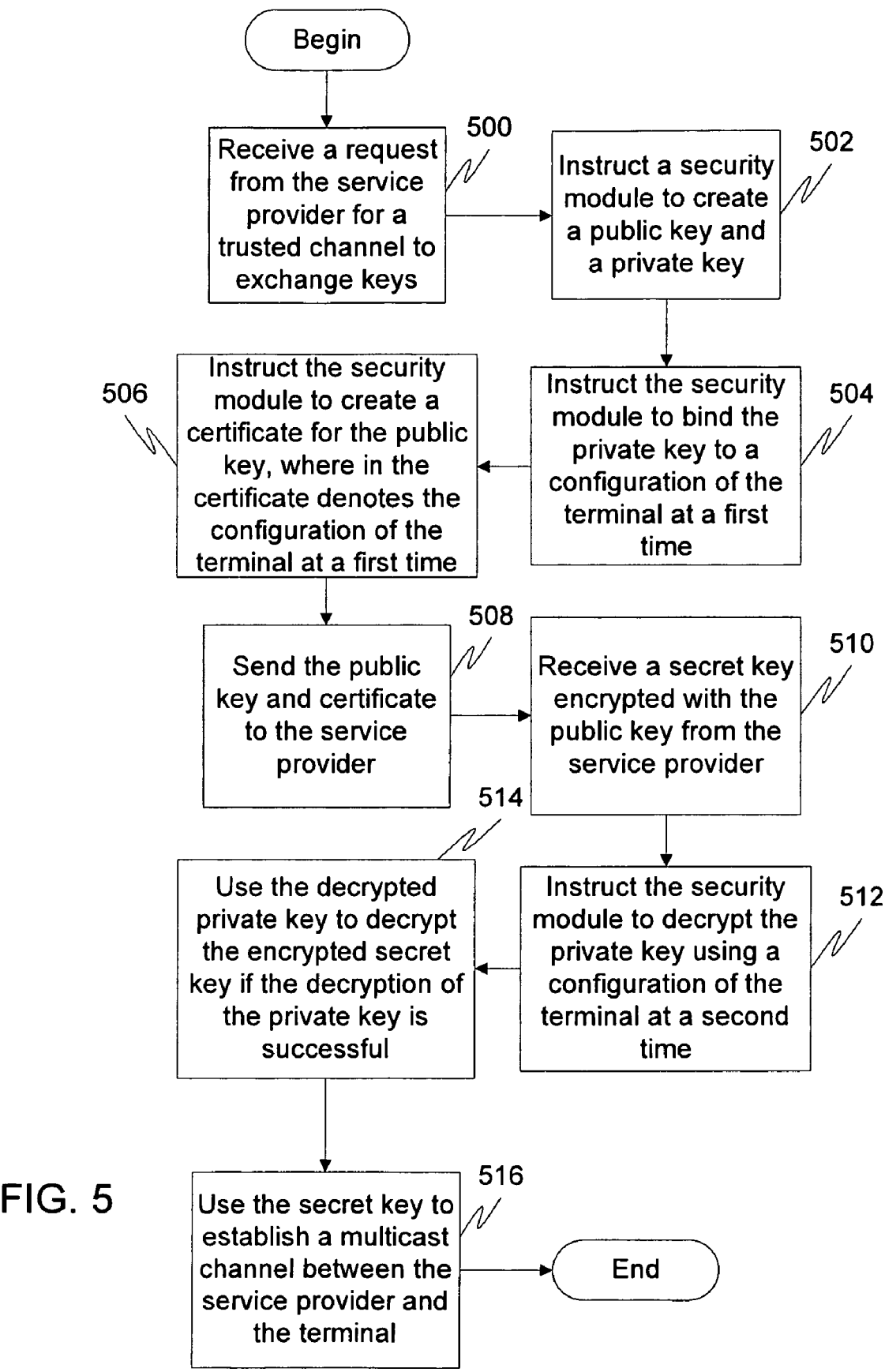
FIG. 5 is a flow diagram illustrating a method for establishing a secure multicast channel between a service provider and a terminal in accordance with another embodiment of the present invention.

FIG. 5 is a flow diagram illustrating a method for establishing a trusted multicast channel between a service provider and a terminal in accordance with another embodiment of the present invention. Each step in this method may be performed in hardware, software, or any combination thereof. This method may be executed on an end-user device, such as a terminal. As such, the steps of this method are described from the viewpoint of the terminal device itself, and specifically the operations performed by a processor of the terminal device.

At 500, a request may be received from the service provider for a trusted channel in order to exchange keys. At 502, a security module is instructed to create a public key and a private key. At 504, the security module is instructed to bind the private key to a configuration of the terminal at a first time. At 506, the security module is instructed to create a certificate for the public key, wherein the certificate denotes the configuration of the terminal at a first time. At 508, the public key and certificate are sent to the service provider.

At 510, a secret key encrypted with the public key is received from the service provider. At 512, the security module is instructed to decrypt the private key using a configuration of the terminal at a second time. At 514, if the decryption of the private key is successful, the decrypted private key is used to decrypt the encrypted secret key. At 516, the secret key is used to establish a multicast channel between the service provider and the terminal.

Should the administrator or user wish to allow a first application to establish a trusted channel on behalf of a second application, it may be necessary for the first application to store the secret key in a manner that can be read by the second application, as the configuration will be different for different applications. This may be, for example, in plain text. Such actions, of course, may create security implications of their own, but are potentially useful in certain cases.

Figure 6:
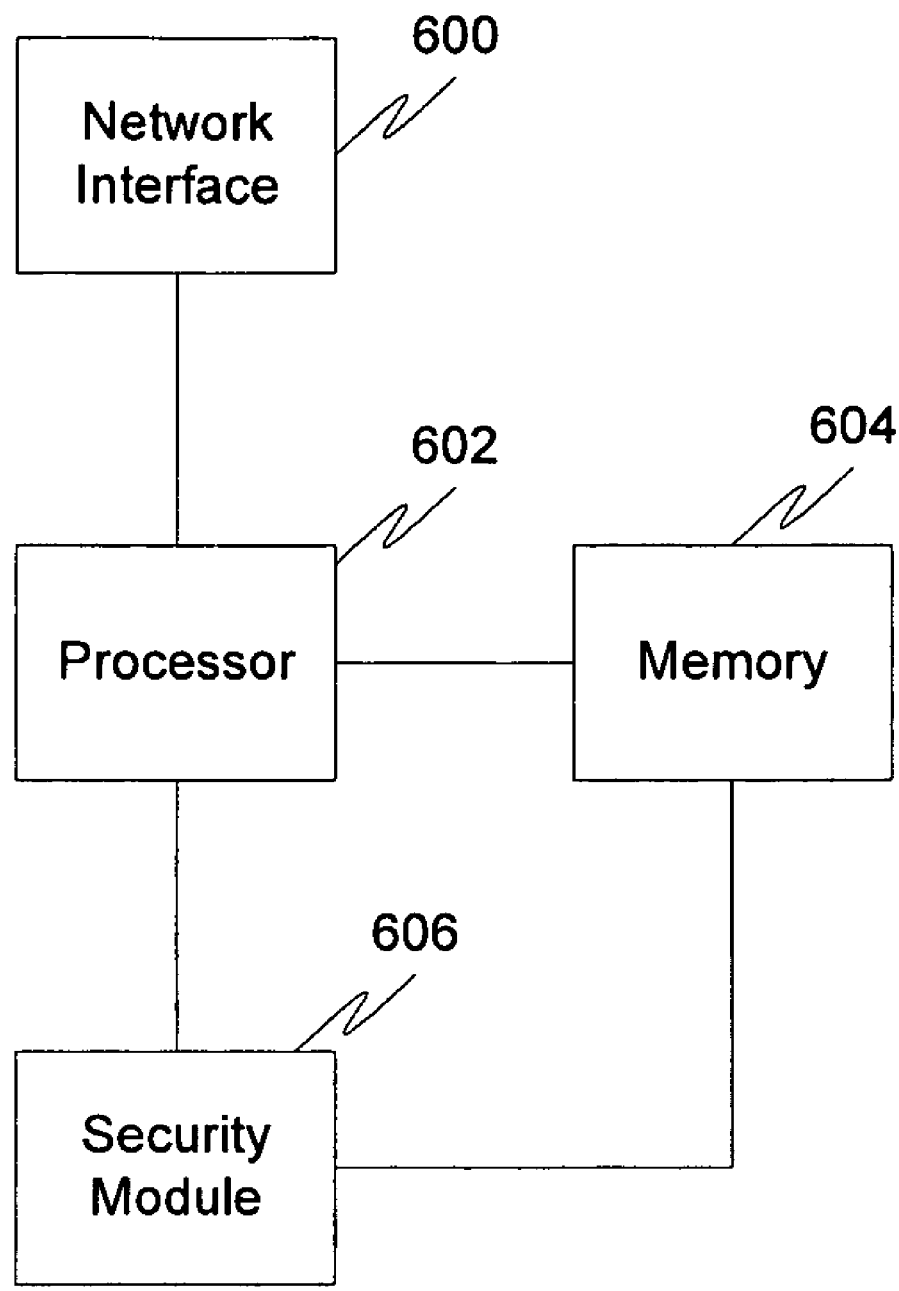
FIG. 6 is a block diagram illustrating a system in accordance with an embodiment of the present invention.

FIG. 6 is a block diagram illustrating a system in accordance with an embodiment of the present invention. The system may be included in a terminal, such as set-top box, although in some embodiments various elements of the system may be located elsewhere. The system may include a network interface 600, a processor 602, and a memory 604. In some embodiments, a security module 606 may also be included. The processor 602 may be configured to perform various steps, including the steps of FIGS. 3-5. The network interface 600 may be used to communicate to and from the service provider. The memory 604 may be used to store a current configuration of the terminal. The security module 606 may be, for example, a TPM, and may be used to perform operations related to verifying trusted components.

While the invention has been particularly shown and described with reference to specific embodiments thereof, it will be understood by those skilled in the art that changes in the form and details of the disclosed embodiments may be made without departing from the spirit or scope of the invention. In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A method for establishing a secure multicast channel between a service provider and a terminal, the method comprising:
   receiving a request from the service provider for a configuration of the terminal;
   sending a configuration of the terminal at a first time to the service provider;
   obtaining a security key, wherein the security key is unique to the terminal and is bound to the configuration of the terminal at the first time, wherein the configuration includes a current state of operation of any running application; wherein the security key is a master key and the obtaining the security key comprises:
   obtaining a private key and a public key, wherein the private key is bound to the configuration of the terminal at the first time; and
   decrypting the security key using the private key;
   decrypting the security key using a configuration of the terminal at a second time, wherein the decryption fails when the configuration of the terminal at the second time is not identical to the configuration of the terminal at the first time; and
   establishing a secure multicast channel with the service provider and the terminal using the security key.

2. The method of claim 1, wherein the establishing includes:
   obtaining one or more work keys;
   decrypting the one or more work keys using the security key;
   obtaining one or more scramble keys;
   decrypting the one or more scramble keys using the one or more work keys; and
   decrypting content broadcast on the multicast channel using the one or more scramble keys.

3. The method of claim 1, further comprising:
   if the decryption fails, receiving a demand from the service provider to force an update to the configuration.

4. The method of claim 1, wherein the configuration includes results of an application integrity check.

5. The method of claim 1, wherein the configuration includes a binding to details about a secure distribution system and wherein the configuration is specified by a service provider.

6. The method of claim 5, wherein the secure distribution system is a Conditional Access System (CAS).

7. A method for establishing a secure multicast channel between a service provider and a terminal, the method comprising:

instructing a security module to create a public key and a private key, wherein the private key is unique to the terminal;
instructing the security module to bind the private key to a configuration of the terminal at a first time, wherein the configuration includes a current state of operation of any running application;
instructing the security module to create a certificate for the public key, wherein the certificate denotes the configuration of the terminal at a first time;
sending the public key and certificate to the service provider;
receiving, from the service provider, a secret key encrypted with the public key;
instructing the security module to decrypt the private key using a configuration of the terminal at a second time;
when the decryption of the private key is successful, using the decrypted private key to decrypt the encrypted secret key; and
establishing a secure multicast channel between the service provider and the terminal using the secret key.

8. The method of claim 7, further comprising:
receiving a request from the service provider for a trusted channel for the exchange of keys prior to the instructing a security module to create a public key and a private key.

9. The method of claim 7, further comprising:
causing a first application in the configuration to store the secret key in a format that is readable by a second application not in the configuration.

10. The method of claim 7, wherein the security module is a security module is a trusted platform module (TPM).

11. A system comprising:
a network interface;
a processor;
a memory, wherein the memory is configured to store a current configuration of a terminal,
wherein the processor is configured to:
 receive a request from the service provider for a configuration of the terminal;
 send a configuration of the terminal at a first time to the service provider;
 obtain a security key, wherein the security key is unique to the terminal and is bound to the configuration of the terminal at the first time, wherein the configuration includes a current state of operation of any running application;
 wherein the security key is a master key and the obtaining the security key comprises:
 obtaining a private key and a public key, wherein the private key is bound to the configuration of the terminal at the first time; and
 decrypting the security key using the private key;
  decrypt the security key using a configuration of the terminal at a second time, wherein the decryption fails when the configuration of the terminal at the second time is not identical to the configuration of the terminal at the first time; and
  establish a secure multicast channel with the service provider and the terminal using the security key.

12. The system of claim 11, further comprising a security module.

13. A system comprising:
a network interface;
a processor;
a security module;
a memory, wherein the memory is configured to store a current configuration of a terminal,
wherein the processor is configured to:
 instruct a security module to create a public key and a private key, wherein the private key is unique to the terminal;
 instruct the security module to bind the private key to a configuration of the terminal at a first time, wherein the configuration includes a current state of operation of any running application;
 instruct the security module to create a certificate for the public key, wherein the certificate denotes the configuration of the terminal at a first time;
 send the public key and certificate to the service provider;
 receive, from the service provider, a secret key encrypted with the public key;
 instruct the security module to decrypt the private key using a configuration of the terminal at a second time;
 when the decryption of the private key is successful, use the decrypted private key to decrypt the encrypted secret key; and
 establishing a secure multicast channel between the service provider and the terminal using the secret key.

14. An apparatus for establishing a secure multicast channel between a service provider and a terminal, the apparatus comprising:
means for receiving a request from the service provider for a configuration of the terminal;
means for sending a configuration of the terminal at a first time to the service provider;
means for obtaining a security key, wherein the security key is unique to the terminal and is bound to the configuration of the terminal at the first time, wherein the configuration includes a current state of operation of any running application;
wherein the security key is a master key and the means for obtaining the security key comprises:
 obtaining a private key and a public key, wherein the private key is bound to the configuration of the terminal at the first time; and
 decrypting the security key using the private key;
means for decrypting the security key using a configuration of the terminal at a second time, wherein the decryption fails when the configuration of the terminal at the second time is not identical to the configuration of the terminal at the first time; and
means for establishing a secure multicast channel with the service provider using the security key.

15. An apparatus for establishing a secure multicast channel between a service provider and a terminal, the apparatus comprising:
means for instructing a security module to create a public key and a private key, wherein the private key is unique to the terminal;
means for instructing the security module to bind the private key to a configuration of the terminal at a first time, wherein the configuration includes a current state of operation of any running application;
means for instructing the security module to create a certificate for the public key, wherein the certificate denotes the configuration of the terminal at a first time;
means for sending the public key and certificate to the service provider;
means for receiving, from the service provider, a secret key encrypted with the public key;

means for instructing the security module to decrypt the private key using a configuration of the terminal at a second time;

means for, when the decryption of the private key is successful, using the decrypted private key to decrypt the encrypted secret key; and means for using the secret key to establish a secure multicast channel between the service provider and the terminal.

16. A program storage device readable by a machine tangibly embodying a program of instructions executable by the machine to perform a method for establishing a secure multicast channel between a service provider and a terminal, the method comprising:

receiving a request from the service provider for a configuration of the terminal;

sending a configuration of the terminal at a first time to the service provider;

obtaining a security key, wherein the security key is unique to the terminal and is bound to the configuration of the terminal at the first time, wherein the configuration includes a current state of operation of any running application;

wherein the security key is a master key and the obtaining the security key comprises:

obtaining a private key and a public key, wherein the private key is bound to the configuration of the terminal at the first time; and decrypting the security key using the private key;

decrypting the security key using a configuration of the terminal at a second time, wherein the decryption fails when the configuration of the terminal at the second time is not identical to the configuration of the terminal at the first time; and establishing a secure multicast channel with the service provider and the terminal using the security key.

17. A program storage device readable by a machine tangibly embodying a program of instructions executable by the machine to perform a method for establishing a secure multicast channel between a service provider and a terminal, the method comprising:

instructing a security module to create a public key and a private key, wherein the private key is unique to the terminal;

instructing the security module to bind the private key to a configuration of the terminal at a first time, wherein the configuration includes a current state of operation of any running application;

instructing the security module to create a certificate for the public key, wherein the certificate denotes the configuration of the terminal at a first time;

sending the public key and certificate to the service provider;

receiving, from the service provider, a secret key encrypted with the public key;

instructing the security module to decrypt the private key using a configuration of the terminal at a second time;

when the decryption of the private key is successful, using the decrypted private key to decrypt the encrypted secret key; and establishing a secure multicast channel between the service provider and the terminal using the secret key.

18. The method of claim 1, wherein the obtaining a security key, the decrypting the security key, and the establishing a secure multicast channel are performed using a smartcard-based conditional access system (CAS).

19. The method of claim 18, wherein the CAS is operated by a hardware trusted platform module integrated into the terminal.

20. The method of claim 19, wherein the security key is bound to a configuration of the terminal.

* * * * *